Nov. 5, 1940.   W. D. WALLACE   2,220,592
SAFETY DEVICE
Filed May 20, 1938
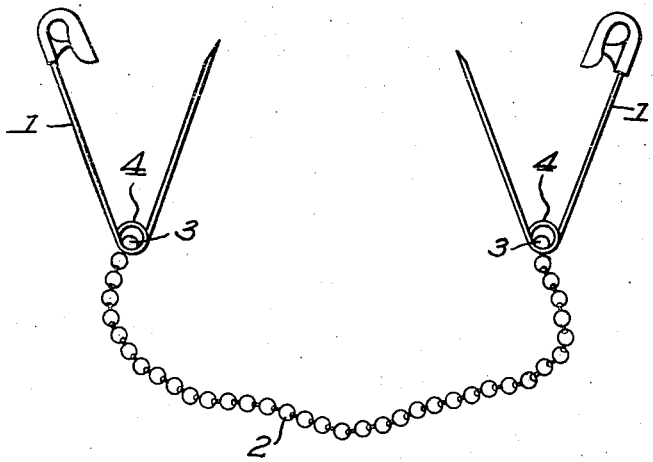
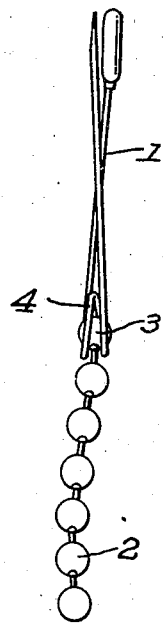
Winfield D Wallace INVENTOR.

Patented Nov. 5, 1940

2,220,592

UNITED STATES PATENT OFFICE 2,220,592

SAFETY DEVICE

Winfield D. Wallace, Milwaukie, Oreg., assignor to Clarence W. Johnston, Portland, Oreg.

Application May 20, 1938, Serial No. 209,033

1 Claim. (Cl. 24—87)

My invention relates to improvements in a safety device, commonly used in fastening infants' garments, which consists of two safety pins fastened together by a connecting element as shown in the drawing, or by any other flexible medium; and the objects of my improvement are, first, to prevent the swallowing of the safety pin by infants; second, to prevent losing or misplacing of one or the other of the pins.

I attain these objects by the device illustrated in the accompanying drawing, in which—

Figure 1 is an illustration of the entire device;

Figure 2 is an elevation showing the particular relation of the bead or ball chain connection with the end of a pin.

The device illustrated in the drawing comprises safety pins 1—1, each pin having a spring loop 4 of wire positioned at one end of the pin between the return bends of the wire, the pins 1 being interconnected by a swivel ball chain 2, the end balls of which chain are secured within the loops 4—4 of the respective pins. Each end ball of the chain 2 is inserted into the loop 4 of one safety pin in such manner that the chain link 3 extends from between the bends of the loop 4 of the pin, thus preventing displacement of the ball from the loop 4.

Each ball of the chain 2 is swiveled so as to turn on each adjacent ball, by reason of which each of the pins 1—1 is swiveled so as to turn freely and relatively of the chain and the other pin. There can, therefore, be no binding or tangling of the chain, and no consequent discomfiture to the wearer.

Primarily, the device is intended for fastening infants' garments, an important attribute thereof being to forestall the swallowing of a safety pin by an infant, or the danger of losing a pin among the infant's clothing or bedding.

I claim:

A device for pinning infants' diapers, consisting of a pair of safety pins having unguarded points when unfastened, each of said safety pins having a spring loop of wire ending in return bends which form the body of said pin, one of said return bends forming the point of said pin, a swivel ball chain consisting of a series of balls with interconnecting links connecting said safety pins, the end balls of said chain being slightly smaller than the said spring loops of wire, the interconnecting link for each of said end balls passing between juxtaposed bends of said loop so that each of said end balls is held within the loop, the swivel chain being constructed and arranged for relative rotation of its parts and of the two safety pins.

WINFIELD D. WALLACE.